Nov. 20, 1962     H. P. M. QUILLERY     3,064,495
STEERING WHEELS FOR MOTOR VEHICLES
Filed Oct. 30, 1959     2 Sheets-Sheet 1
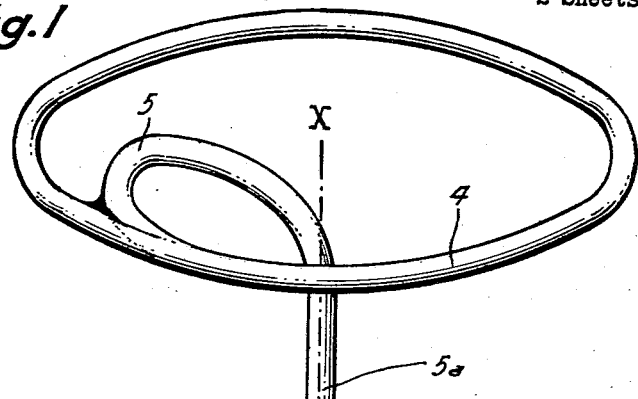
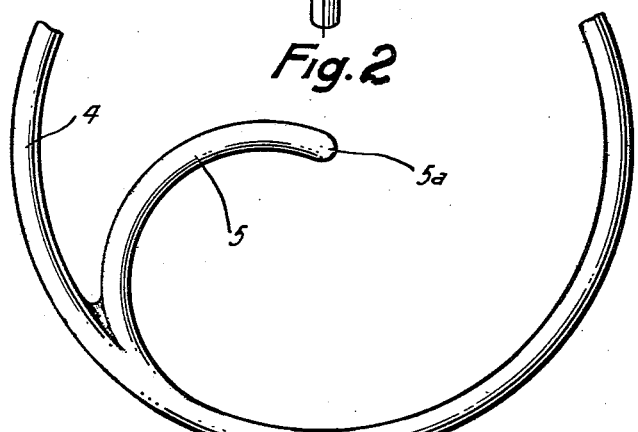
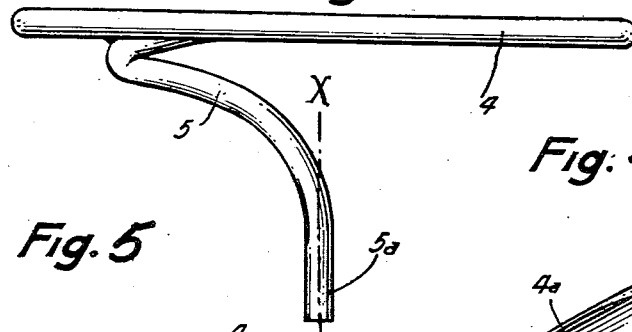
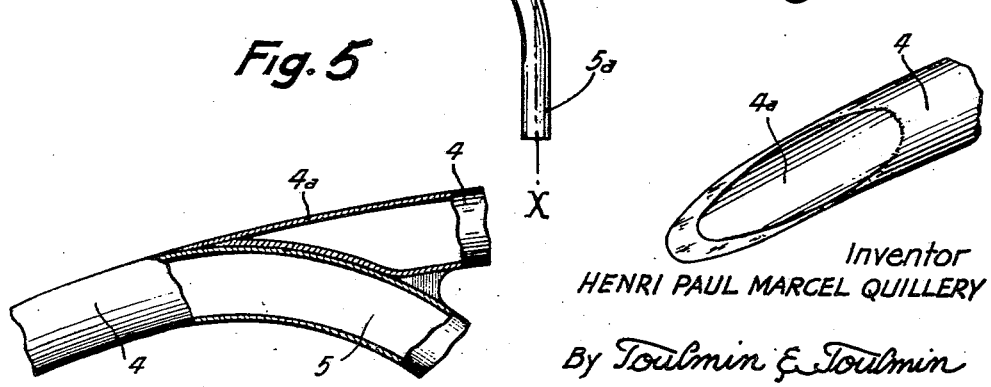
Inventor
HENRI PAUL MARCEL QUILLERY
By Toulmin & Toulmin
Attorneys Nov. 20, 1962  H. P. M. QUILLERY  3,064,495
STEERING WHEELS FOR MOTOR VEHICLES
Filed Oct. 30, 1959  2 Sheets-Sheet 2
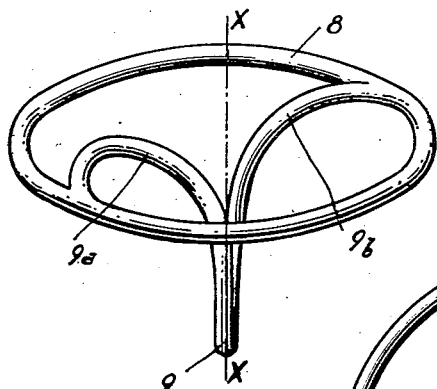
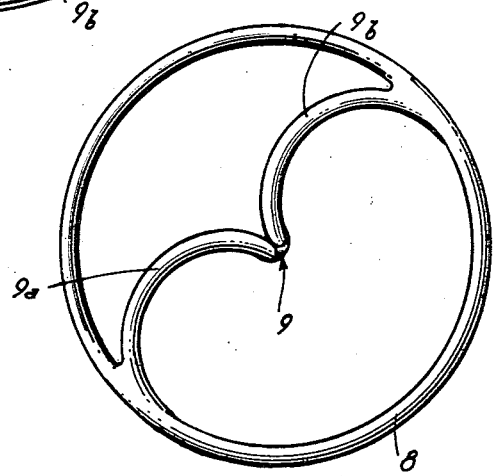
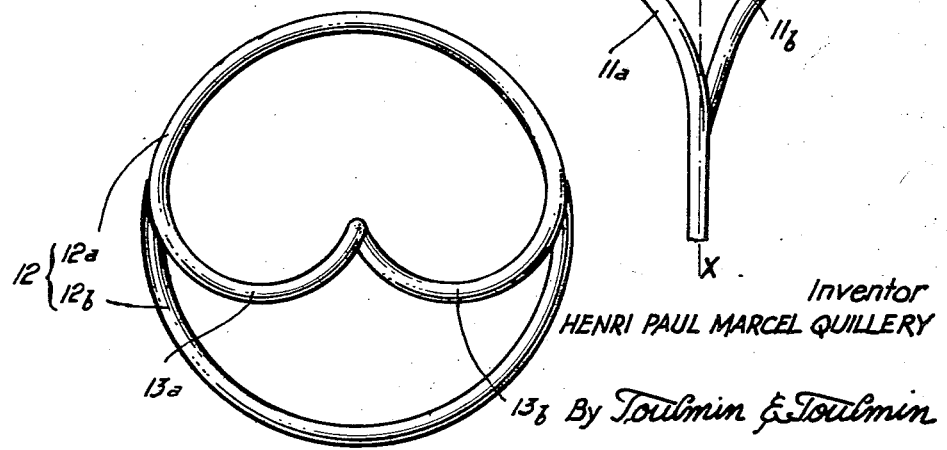
Inventor
HENRI PAUL MARCEL QUILLERY
By Toulmin & Toulmin
Attorneys ent Office 3,064,495
Patented Nov. 20, 1962

3,064,495
STEERING WHEELS FOR MOTOR VEHICLES
Henri Paul Marcel Quillery, 52 Rue Veuve-Lacroix,
La Garenne-Colombes, France
Filed Oct. 30, 1959, Ser. No. 849,946
Claims priority, application France Nov. 7, 1958
7 Claims. (Cl. 74—552)

The present invention relates to steering wheels and in particular those utilized in motor vehicles and the like. It concerns more particularly questions of safety related to these steering wheels.

It is known that in motor vehicles the safety of the driver in the event of an accident in the course of which the driver has a tendency to be thrown forward, has several aspects.

First of all, the steering wheel must not break under the impact of the driver who is thrown violently against the wheel, since breakage of the latter will produce projecting parts which are dangerous for the driver. This risk of breakage has been eliminated by avoiding, in the construction of steering wheels, frames composed of a fragile material having little elongation (cast iron, cast alloys) and covering or coating materials having little elongation (for example thermosetting resins, hard ebonite).

The steering wheel must also be capable of absorbing the maximum of stress under a force whose limit corresponds to the force the arms and the thorax of the driver are capable of supporting.

These conditions have been met in the past by constructing steering wheels of materials (steel and covering material) which permit a large deformation under a more or less progressive force which reaches, for example, 22 to 23 lbs. (avdp.) when the deformation reaches 6 to 8 inches.

These characteristics can be considered satisfactory when, at the moment of the accident, the driver is firmly holding the steering wheel. However, they no longer suffice when the hands of the conductor do not firmly grip the steering wheel, since in this case the driver is thrown forward and his thorax violently strikes against the steering wheel.

It is necessary therefore always to absorb the kinetic energy of the driver but this absorption must be progressive. In other words, it is necessary that the steering wheel initially possess a certain flexibility (such that the first centimeters of the deformation corresponds to a slight force) in order to become later gradually more firm (stress increasing with the deformation).

Preferably, the kinetic energy of the driver must, in the course of the displacement of the latter, be completely absorbed before the thorax comes into contact with the upper end of the steering column or the hub of the steering wheel.

The safety steering wheel according to the invention solves the various problems mentioned hereinbefore and is characterized in that it comprises at least one curved arm which is bent in the form of a warped curve so that one of its ends is substantially tangent to the rim and the other end is substantially coaxial with the axis of the steering wheel, the assembly of the steering wheel being inscribed in a relatively deep dish-shaped body.

Various embodiments can be constructed based on the aforementioned characteristics:

In a specific embodiment derived from the foregoing embodiment, the steering wheel comprises at least two arms, each of which is bent into the warped curve mentioned hereinbefore.

The ends of the arms are located in the extension of the axis of the steering column and are interconnected so as to form one piece.

The arms are connected to the rim of the steering wheel (constructed separately) by welding, brazing, or any other like means.

One of the arms of the steering wheel is in one piece with the rim or hoop of the steering wheel whereas the other arm is attached and has its ends fixed by welding, brazing or any other like means respectively to the rim of the steering wheel and to the first arm.

The two arms of the steering wheel are in one piece with one part of the rim of the steering wheel, the other part of which is an attached member fixed to the first part by welding, brazing or any other like means.

In all of the aforementioned embodiments, the solid or tubular bar or bars can be painted, enamelied or covered with plastic material for which this bar or bars constitute a reinforcement.

Further features and advantages of the invention will be apparent from the ensuing description, with reference to some embodiments of the safety steering wheel of the invention, which embodiments have been given merely by way of example and are diagrammatically shown in the accompanying drawings, in which:

FIG. 1 is a perspective view of an embodiment of the steering wheel;

FIG. 2 is a partial plan view of the wheel shown in FIG. 1;

FIG. 3 is a side elevational view of the wheel shown in FIG. 1;

FIG. 4 is a perspective view, on an enlarged scale, of the free end of the part of the tubular bar constituting the rim of the steering wheel;

FIG. 5 is a partial sectional view, on an enlarged scale, of the region of the connection between the arm and the rim of the steering wheel;

FIG. 6 is a perspective view of an embodiment of a two-armed steering wheel;

FIG. 7 is a plan view of the steering wheel shown in FIG. 6;

FIG. 8 is a side elevational view of a modification, and

FIG. 9 is a plan view of another modification of the steering wheel.

In the embodiment shown in FIGS. 1 to 5, the steering wheel is composed of a single tubular bar a part of which is bent in a plane containing a circumference so as to form the rim 4 of the steering wheel, the other part being bent in the form of a warped curve so as to constitute a single arm 5 which is tangent at one end to the rim 4, the free end 5a of the arm being adapted to be disposed coaxial with the axis X—X of the steering column or parallel therewith.

The free end 4a of the part of the bar forming the rim is pressed (see FIGS. 4 and 5) and thinned down (or cut at a bevel) so as to be connected to the beginning of the arm 5 without increase in thickness in the region of the connection.

The connection of the end 4a can be effected by for example welding or brazing.

To facilitate bending the tube (and possibly the moulding, that is, the covering of the tube with plastic material, by injection moulding), the tube could be filled with sand, resin or an alloy having a low melting point and which is expelled by heating after bending or cambering (and moulding) the tube.

In the embodiment shown in FIGS. 6 and 7, the steering wheel comprises a rim 8 to which are connected two arms 9a and 9b having the shape of a warped curve and whose upper ends are connected to the rim 8 (for example by welding or brazing) in such manner as to be substantially tangent to this rim.

The lower ends of the arms are interconnected so as to terminate to a common portion 9 adapted to be mounted coaxially of the axis X—X of the steering column.

In the embodiment shown in FIG. 8, the rim 10 is in one piece with the arm 11a (as shown in FIGS. 1 to 5). The arm 11b is attached and connected respectively to the rim 10 and to the arm 11a by welding, brazing or any other like means.

In the modification shown in FIG. 9, the rim 12 comprises a part 12a of a rim or hoop which continues in the form of the arms 13a and 13b, the other part 12b of the rim 12 being attached and connected to the part 12a of the rim by for example welding or brazing.

In all the embodiments shown in the drawings and described hereinbefore, the rim and/or the arms are obtained from solid bars or tubes which are suitably bent, and the ends of the attached parts are thinned down (or cut at a bevel) so as not to increase the thickness in the regions of the connections.

It must be understood that the embodiments of the steering wheel described hereinbefore and shown in the accompanying drawings have only been given by way of examples, and many modifications of detail can be made therein.

Thus, the frame, which is shown to be of round-section steel, can be made for example of steel which has a polygonal cross-section and is solid or hollow (both the rim and the arm or arms or only one of these parts) or of steel tube.

It will be understood that the metal frame of the steering wheel is (or can be) covered with for example rubber, flexible ebonite or plastic material.

What I claim is:

1. A steering wheel for a motor vehicle comprising a rim and at least one arm having one of its two ends connected to the rim, said arm being bent in the form of a warped curve so that one of its ends is substantially tangent to the rim and the other end is substantially coaxial with the axis of the steering wheel.

2. Steering wheel as claimed in claim 1, wherein the rim and the arm are composed of a single bar.

3. Steering wheel as claimed in claim 2, wherein the end of the part of the bar constituting the rim is tangentially connected to the region of the part of the bar constituting the end of the arm connected to the rim.

4. Steering wheel as claimed in claim 1, further comprising at least a second arm, the arm ends being coaxial with the axis of the steering wheel and being interconnected so as to constitute a single portion.

5. Steering wheel as claimed in claim 1, wherein one arm is constituted by a single member in one piece with the rim, the steering wheel further comprising at least a second arm which is fixed at its ends respectively to the rim and to the first arm.

6. In a steering wheel for a motor vehicle, comprising a rim in two parts and two arms each having one of its ends connected to said rim: each of said arms is bent in the form of a warped curve, so that one of its ends is substantially tangent to the rim and the other is coaxial with the axis of the steering wheel, the two arms being in one piece with a part of the rim, the other part of which latter is fixed to the first-mentioned part in the connection regions of the first-mentioned part and said two arms.

7. A steering wheel for motor vehicles, comprising a rim, a hub and at least one arm the ends of which are respectively connected to said rim and to said hub, said arm being bent in the form of a warped curve so that one of its ends is substantially tangent to the rim and the other end is substantially coaxial with the axis of the steering wheel, the assembly of the steering wheel being inscribed in a deep dish-shaped body.

References Cited in the file of this patent

UNITED STATES PATENTS

| | | |
|---|---|---|
| D. 118,503 | Parriott | Jan. 9, 1940 |
| 793,468 | Phelps | June 27, 1905 |
| 1,225,622 | Hall | May 8, 1917 |
| 1,520,191 | Mackey | Dec. 23, 1924 |
| 1,811,269 | Hanson et al. | June 23, 1931 |
| 1,912,088 | Mitchell | May 30, 1933 |
| 2,179,013 | Kaye | Nov. 7, 1939 |

FOREIGN PATENTS

| | | |
|---|---|---|
| 66,774 | France | Mar. 18, 1957 |
| | (Add. to No. 1,090,586) | |
| 848,458 | Germany | Sept. 4, 1952 |
| 1,124,131 | France | June 25, 1956 |
| 1,151,080 | France | Aug. 19, 1957 |
| 1,210,369 | France | Sept. 28, 1959 |
| 1,211,113 | France | Oct. 5, 1959 |
| 1,216,366 | France | Nov. 30, 1959 |
| 1,231,357 | France | Apr. 11, 1960 |
| 1,237,834 | France | June 27, 1960 |